Figure 3:
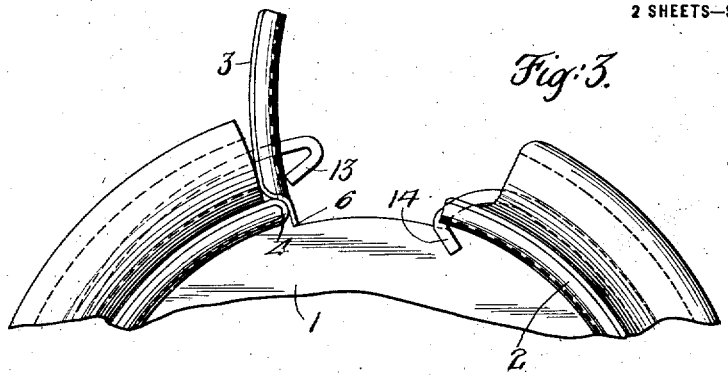

C. A. CHANNELL.
MOP HEAD.
APPLICATION FILED JULY 18, 1917.
Reissued Dec. 21, 1920. 15,010.
2 SHEETS—SHEET 1.
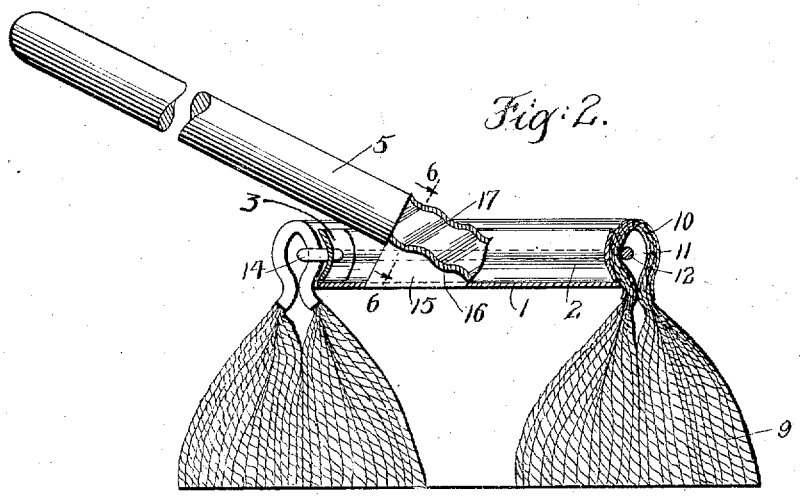
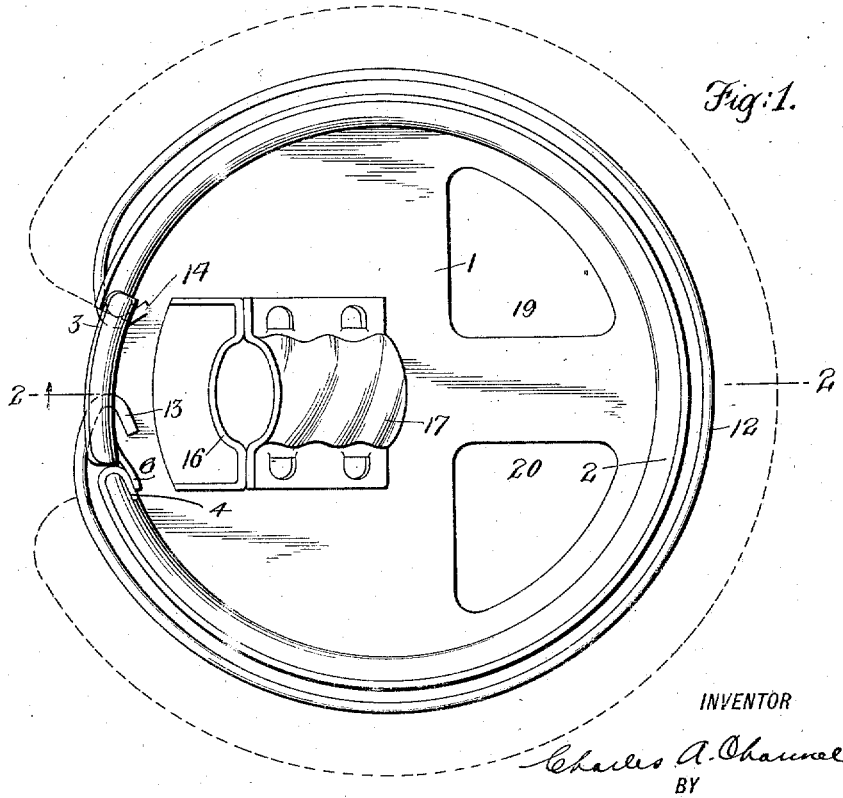
INVENTOR
Charles A. Channell
BY
Kenyon & Kenyon
ATTORNEYS

C. A. CHANNELL.

MOP HEAD.

APPLICATION FILED JULY 18, 1917.

Reissued Dec. 21, 1920. 15,010.

2 SHEETS—SHEET 2.

INVENTOR

Charles A. Channell

BY

Kempton & Kempton, his ATTORNEYS

UNITED STATES PATENT OFFICE.

CHARLES A. CHANNELL, OF CHICAGO, ILLINOIS, ASSIGNOR TO CHANNELL CHEMICAL COMPANY, OF CHICAGO, ILLINOIS, A CORPORATION OF ILLINOIS.

MOP-HEAD.

15,010. Specification of Reissued Letters Patent. Reissued Dec. 21, 1920.

Original No. 1,148,955, dated August 3, 1915, Serial No. 759,875, filed April 9, 1913. Application for reissue filed July 18, 1917. Serial No. 181,425.

*To all whom it may concern:*

Be it known that I, CHARLES A. CHANNELL, a citizen of the United States, and a resident of the city of Chicago, in the county of Cook and State of Illinois, have invented certain new and useful Improvements in Mop-Heads; and I do hereby declare that the following is a full, clear, and exact description of the same, reference being had to the accompanying drawings, and to the numbers of reference marked thereon, which form a part of this specification.

Heretofore in mops of this character the means used for attaching the mops to the mop heads have proved to be inconvenient, owing to the fact that more or less handling of the mop fabric becomes necessary, and inasmuch as the same is saturated with oil, this is undesirable.

This invention relates to an improved means for attaching the mop to the mop head wherein the mop head is provided with a locking lever facilitating the attachment of the mop thereto, and greatly improving the operation of the device in other respects.

It is an object of this invention to provide a mop head adapted to support and reinforce the mop along the entire length thereof and provided with quick attaching means.

It is also an object of this invention to provide a device whereby the mop may be easily and loosely engaged upon the mop head and then tightened securely thereupon and locked in such position until intentionally released by the operator.

It is also an object of this invention to provide a mop head having a continuous grooved flange to insure positive retainment of the mop thereupon in proper extended relation, and affording a pivoted lever for tightening and locking the engaging means of the mop on the mop head.

It is furthermore an object of this invention to provide a mop head with a grooved flange, one section of which is pivoted and slotted to receive the extremities of an attaching wire to engage and lock a mop on said mop head along the grooved flange.

It is finally an object of this invention to provide a simple device of durable construction which may be readily stamped from sheet metal, and which affords quick attachment and locking means for a mop.

The invention (in a preferred form) is illustrated in the drawings, and hereinafter more fully described.

Figure 4:
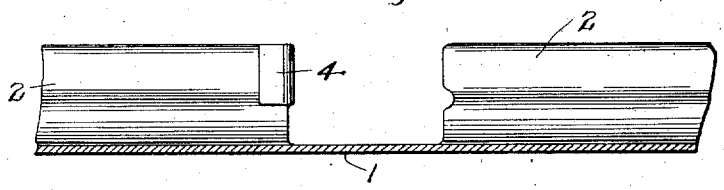
Figure 5:
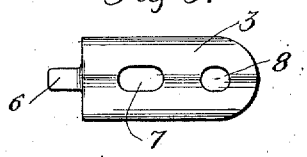
Figure 6:
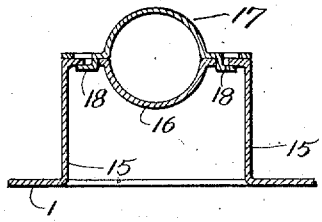
Figure 7:
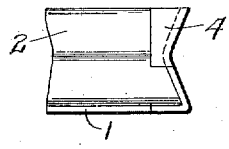

In the drawings: Figure 1 is a top plan view of the mop head, showing the mop in dotted lines. Fig. 2 is a central section taken therethrough on line 2—2 of Fig. 1, and showing the handle attached. Fig. 3 is a fragmentary detail view in top elevation showing the locking and retaining element in release position. Fig. 4 is a fragmentary view showing the gap in the retaining flange of the mop head for the reception of the locking member. Fig. 5 is a front elevation of the locking member adapted to extend across the gap in the retaining flange of the mop head. Fig. 6 is a section on line 6—6 of Fig. 2. Fig. 7 is an edge view of one end of the mop head flange terminating at the gap.

As shown in the drawings: the mop head comprises a sheet of metal stamped to afford the bottom or carrier plate 1, and a grooved flange 2, which extends almost completely around said bottom, the ends terminating at a short distance from one another, to afford a gap for the reception of a locking member 3. The upper portion 4, of one end of said flange 2, forming one side of said gap, is flanged over and inwardly, affording a smooth fulcrum point for an ear 6, on the attaching member 3. The attaching and locking member 3, comprises a strip of metal conforming to the curvature of said flange wall 2, and is provided with slots 7 and 8, therein, of which the slot 7, is slightly longer than the slot 8.

The mop comprises a plurality of fabric strands 9, which are looped over at their middle and secured within a fabric covering band 10, thus affording an annular recess 11, through which is inserted a resilient steel wire or rod 12. Said wire 12, is hooked over at each of its ends 13, and 14, respectively, the end 13 adapted to extend through the slot 7, and the end 14 through the slot 8, in said locking member 3.

The bottom portion 1, of said mop head is struck upwardly to afford side walls 15, and an inclined curved portion 16. A cover plate having a similarly curved portion 17 is secured in register over said portion 16, with integral downwardly extending and laterally turned ears 18, thereof engaging in suitable recesses on each side of the portion 16, for securing said members in rigid relation to receive a handle 5, therein. Said bottom portion 1, of the mop head is apertured, as shown at 19 and 20 for lightness.

The operation is as follows: When it is desired to secure the mop upon the mop head, the wire 12, is threaded through the recess 11 in the mop, and the band 10, of the mop is pressed into the groove of the flange 2, by means of the wire 12, with the end 14 thereof hooked over one end of said flange 2, at the gap. The locking member is then inserted over the wire end 13, which projects through the slot 7, as shown in Fig. 3, and with the ear 6 of said member bearing upon the inturned flange 4, as a fulcrum point. The member 3 is then moved about said fulcrum point and over the extremity of the wall 2, on the opposite side of said gap, and then downwardly, permitting the end 14, of the wire to engage through the slot 8, in said locking member, whereby the same is rigidly retained in the gap. It is obvious that the pivotal movement of the locking member, 3, about its fulcrum point, will draw the end 13 of the wire along circumferentially and inwardly thus tightening the wire around the flange walls 2, to effectually secure the mop thereon. The members 16 and 17, affording the engaging means for the handle 5, are stamped to afford threads whereby said handle may be threaded therein and easily detached therefrom.

When it is desired to clean the mop the end of the locking member 3 is disengaged from the hook 14, and raised upwardly and allowed to swing outwardly, thereby releasing the end 13 of said wire 12 and permitting the mop to be detached from the grooved flange wall 2, and the mop may then be washed and cleaned or replaced by a new one, as desired.

I am aware that details of construction may be varied to a wide range without departing from the principles of this invention, and I therefore do not purpose limiting the patent granted otherwise than necessitated by the prior art.

I claim as my invention:

1. In a device of the class described, a sheet metal mop head having an upstanding peripheral grooved flange extending therearound, means releasably securing a mop to said mop head along said grooved flange, and a socket member attached to said mop head within said peripheral flange.

2. In a device of the class described a mop head, an integral peripheral grooved flange extending therearound and having a gap therein, means engaging a mop to said mop head along said grooved flange, and a detachable locking member adapted to engage said means and fit within said gap to secure and lock the mop to the mop head.

3. In a device of the class described a flanged member having a gap in said flange, mop engaging means adapted to be secured around said flange, and a pivotal, detachable locking member adapted to engage said means to tighten and lock the same around said flange.

4. In a device of the class described, a mop head, a peripheral grooved flange extending partly therearound, a slotted locking member, and a projecting ear thereon adapted to engage said flange during the attachment of said member to the flange of said mop head.

5. In a device of the class described, a mop head having a grooved flange thereon provided with a gap therein, a wire adapted to engage in said grooved flange, and a slotted locking member adapted to engage the ends of said wire to tighten the same against said grooved flange and having a lug for securing the locking member to said flange across the gap therein.

6. In a device of the class described, a sheet metal mop head, an outwardly grooved flange extending therearound, a wire adapted to extend therearound and secure a mop thereto in said groove and locking means adapted to engage the ends of said wire and lock the same to said flange.

7. In a device of the class described, a mop head, an integral peripheral grooved flange extending therearound and having a gap therein, and means closing the gap and engaging a mop to said mop head around said grooved flange.

8. In a device of the class described, a mop head, an integral peripheral flange extending therearound and having a gap therein, and a pivoted locking member adapted to fit within said gap and lock a mop to the mop head.

9. In a device of the class described, a flanged member having a gap therein, mop engaging means adapted to be engaged to said flange and a locking member adapted to close said gap and to engage said means to tighten and lock the same around said flange.

10. In a device of the class described, a carrier plate, a socket member attached thereon, an upwardly projecting outwardly concaved integral peripheral flange on said carrier plate, a member for engaging a mop in said concaved flange, and means fulcrumed to said flange to clamp said engaging member in position on the flange.

11. In a device of the class described, the combination of a mop with a mop head comprising a carrier plate, an integral peripheral outwardly concave flange thereon adapted to receive the upper portion of a mop thereagainst, a member connected to said mop head, and means positively holding said member in a position to retain the mop upon the mop head.

12. In a mopping device, a sheet metal mop head rigid throughout and having an upstanding, peripheral grooved flange extending therearound, a mop secured in place with its top lying wholly around the outside of said grooved flange and a socket member attached to said head within said peripheral flange.

13. In a device of the class described, a sheet metal mop head having an upstanding peripheral grooved flange extending therearound, means securing a mop to said mop head around the outside of said grooved flange, and a socket member attached to said mop head within said peripheral flange.

In testimony whereof I have hereunto subscribed my name in the presence of two subscribing witnesses.

CHARLES A. CHANNELL.

Witnesses:
E. R. Perkins,
E. H. Stevens.